United States Patent
Kim

(10) Patent No.: US 11,833,991 B2
(45) Date of Patent: Dec. 5, 2023

(54) FIXING APPARATUS FOR CURTAIN AIRBAG CUSHION AND CURTAIN AIRBAG HAVING THE SAME

(71) Applicant: HYUNDAI MOBIS CO., LTD., Seoul (KR)

(72) Inventor: Ju Kyung Kim, Yongin-si (KR)

(73) Assignee: HYUNDAI MOBIS CO., LTD., Seoul (KR)

(\*) Notice: Subject to any disclaimer, the term of this patent is extended or adjusted under 35 U.S.C. 154(b) by 0 days.

(21) Appl. No.: 17/991,930

(22) Filed: Nov. 22, 2022

(65) Prior Publication Data

US 2023/0303029 A1    Sep. 28, 2023

(30) Foreign Application Priority Data

Mar. 25, 2022  (KR) .................. 10-2022-0037239

(51) Int. Cl.
*B60R 21/232* (2011.01)
*B60R 21/213* (2011.01)
*B60R 21/16* (2006.01)

(52) U.S. Cl.
CPC .......... *B60R 21/232* (2013.01); *B60R 21/213* (2013.01); *B60R 2021/161* (2013.01)

(58) Field of Classification Search
CPC ................ B60R 21/232; B60R 21/213; B60R 2021/161
USPC .............................................. 280/730.2, 728.2
See application file for complete search history.

(56) References Cited

U.S. PATENT DOCUMENTS

| 2005/0173902 A1\* | 8/2005 | Boxey | B60R 21/2171 |
| | | | 280/736 |
| 2009/0079176 A1\* | 3/2009 | Hidaka | B60R 21/213 |
| | | | 280/743.1 |
| 2010/0127484 A1\* | 5/2010 | Son | B60R 21/213 |
| | | | 280/730.2 |
| 2021/0094500 A1\* | 4/2021 | Kim | B60R 21/215 |

FOREIGN PATENT DOCUMENTS

| JP | 2009078715 A | \* | 4/2009 |
| JP | 2009078717 A | \* | 4/2009 |

\* cited by examiner

*Primary Examiner* — Keith J Frisby
(74) *Attorney, Agent, or Firm* — NovoTechIP International PLLC

(57) ABSTRACT

A fixing apparatus for a curtain airbag cushion according to an embodiment of the present invention is a fixing apparatus which is mounted on a vehicle body panel and fixedly supports a curtain airbag cushion and includes a ramp including a support facing the vehicle body panel, a prop extending forward to be curved from a lower end of the support, and a hook provided at an upper end of the support, and a reinforcing plate detachably mounted on the support at the upper end of the support to cover a rear surface of the hook facing the vehicle body panel.

11 Claims, 5 Drawing Sheets

A-A

FIXING APPARATUS FOR CURTAIN AIRBAG CUSHION AND CURTAIN AIRBAG HAVING THE SAME

CROSS-REFERENCE TO RELATED APPLICATIONS

This application claims priority to and the benefit of Korean Patent Application No. 10-2022-0037239, filed on Mar. 25, 2022, the disclosure of which is incorporated herein by reference in its entirety.

TECHNICAL FIELD

The present invention relates to a fixing apparatus for a curtain airbag cushion and a curtain airbag including the same.

BACKGROUND

Generally, airbags which are safety apparatuses, in which airbag cushions receive gas from inflators and inflate to protect passengers in a vehicle accident, are provided in a vehicle.

Airbags are installed in each portion of a vehicle as necessary, and a driver's airbag mounted in a steering wheel to protect a driver seated on a driver's seat, a passenger's airbag mounted at an upper side of a glove box to protect a passenger seated on a passenger's seat, a curtain airbag mounted along a roof side panel to protect a side surface of the passenger, and the like are being proposed.

Among them, the curtain airbag is installed to extend in a longitudinal direction of the vehicle, and an air bag cushion thereof inflates between a door and the passenger in a vehicle accident.

In the curtain airbag, a cushion assembly is formed by folding an airbag cushion and surrounding the airbag cushion using a cushion cover formed of fabric to prevent the airbag cushion from being unfolded and mounting the airbag cushion in the roof side panel, and since, both of the airbag cushion and the cushion cover are formed of flexible materials, in order to fix a mounting shape, a ramp formed of a plastic material having stiffness is provided, and the cushion assembly is installed inside the ramp.

In this case, a cushion mounting tab is fixed to an upper hook part of the ramp through a hook-coupling manner, gas is introduced into the airbag cushion, a very strong external force is applied to the cushion mounting tab to deform the upper hook part and a rear ramp surface when the airbag cushion inflates, a phenomenon in which the cushion mounting tab is pulled out to the outside occurs, and thus there is a problem that the curtain airbag does not function.

SUMMARY

The present invention is intended to solve the above problem, and an objective according to embodiments of the present invention is directed to providing a fixing apparatus for a curtain airbag cushion, in which, when an airbag cushion inflates, a ramp is prevented from being damaged and deformed, and thus a cushion mounting tab can be prevented from being pulled out so that inflation of the curtain airbag cushion is improved, and a curtain airbag including the same.

According to an aspect of the present invention, there is provided a fixing apparatus for a curtain airbag cushion which is mounted on a vehicle body panel and fixedly supports a curtain airbag cushion, the fixing apparatus including a ramp including a support facing the vehicle body panel, a prop extending forward to be curved from a lower end of the support, and a hook part provided at an upper end of the support, and a reinforcing plate detachably mounted on the support at the upper end of the support to cover a rear surface of the hook part facing the vehicle body panel.

The hook part may include a first body extending upward from an upper surface of the support and a second body bent forward from the first body to form a hooking step, wherein the reinforcing plate may be disposed to face a rear surface of the first body to cover the first body.

The reinforcing plate may include a base part extending in a longitudinal direction of the support, a reinforcing part extending upward from a center of an upper end of the base part, connecting parts extending to be bent from both left and right sides of the upper end of the base part with the reinforcing part interposed therebetween, and fixing parts extending to be bent downward from ends of the connecting parts.

The support may include an upper surface having a fitting groove into which the base part is fixedly inserted and a front surface having seating grooves in which the fixing parts are seated.

The support may include seating grooves which are formed in a front surface and a rear surface and in which the fixing parts and the base part are seated, respectively.

The reinforcing plate may include a base part extending in a longitudinal direction of the support, a reinforcing part extending upward from a center of an upper end of the base part, connecting parts extending to be bent forward from both left and right ends of the base part, and fixing parts extending to be bent from ends of the connecting parts toward the base part.

The support may include a front surface having seating grooves in which the fixing parts are seated, the seating grooves may include through holes through which the support passes, and the fixing parts passing through the through holes from a rear surface to the front surface of the support may be fixedly seated in the seating grooves.

The reinforcing plate may be formed of a metal material.

The support may include an accommodation hole through which a cushion mounting tab connected to the curtain airbag cushion passes in a state in which the curtain airbag cushion is disposed on the prop, and the accommodation hole may be disposed under the hook part.

The hook part may be provided as a single hook part or a plurality of hook parts.

According to another aspect of the present invention, there is provided a curtain airbag including an inflator which generates gas, a curtain airbag cushion which is connected to the inflator and inflates when the gas is introduced thereinto, and a fixing apparatus which is mounted on a vehicle body panel and fixedly supports the curtain airbag cushion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
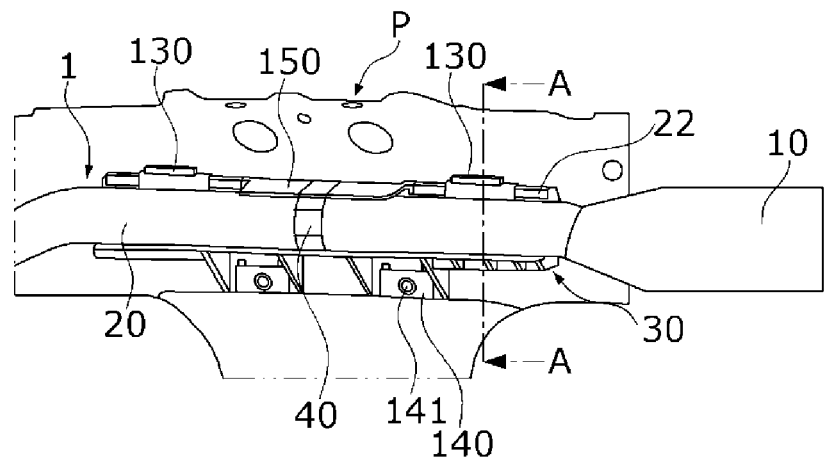
FIG. 1 is a schematic view illustrating a state in which a curtain airbag is mounted in a vehicle according to an embodiment of the present invention.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention. Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, embodiments will be described in detail with reference to the accompanying drawings, components that are the same or correspond to each other will be denoted by the same or corresponding reference numerals regardless of symbols of the accompanying drawings, and redundant descriptions will be omitted.

Hereinafter, a fixing apparatus for a curtain airbag cushion and a curtain airbag including the same according to embodiments of the present invention will be described with reference to the accompanying drawings.

Figure 2:
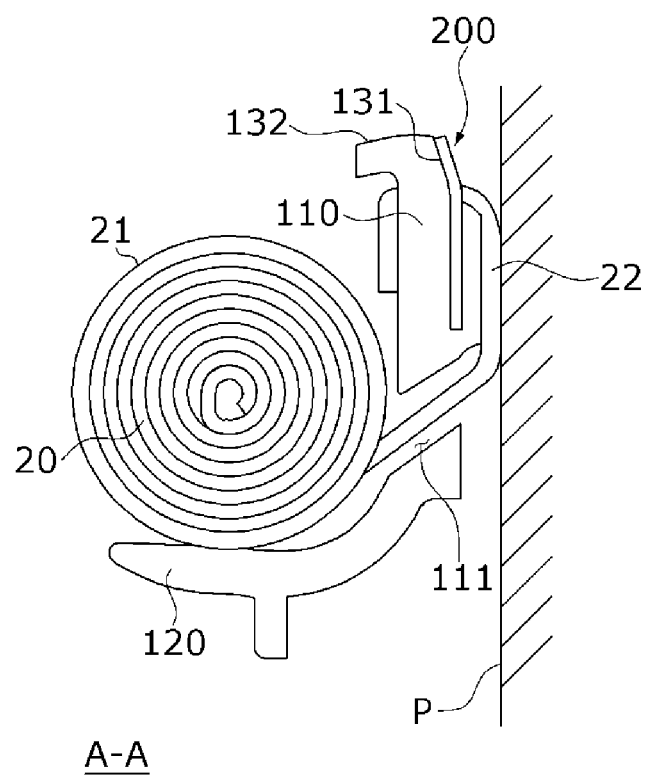
FIG. 2 is a schematic cross-sectional view along line A-A in FIG. 1.
Figure 3:
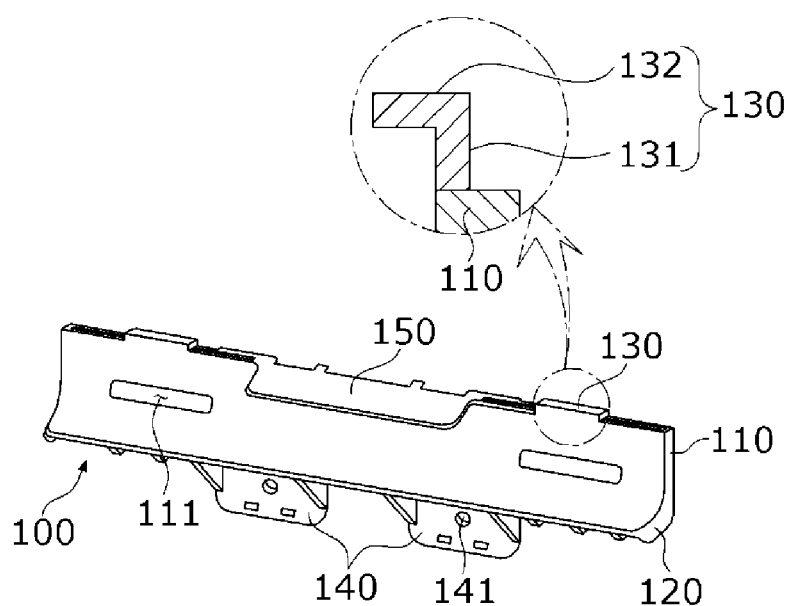
FIG. 3 is a schematic view illustrating a ramp in a fixing apparatus for a curtain airbag cushion according to an embodiment of the present invention.
Figure 4A:
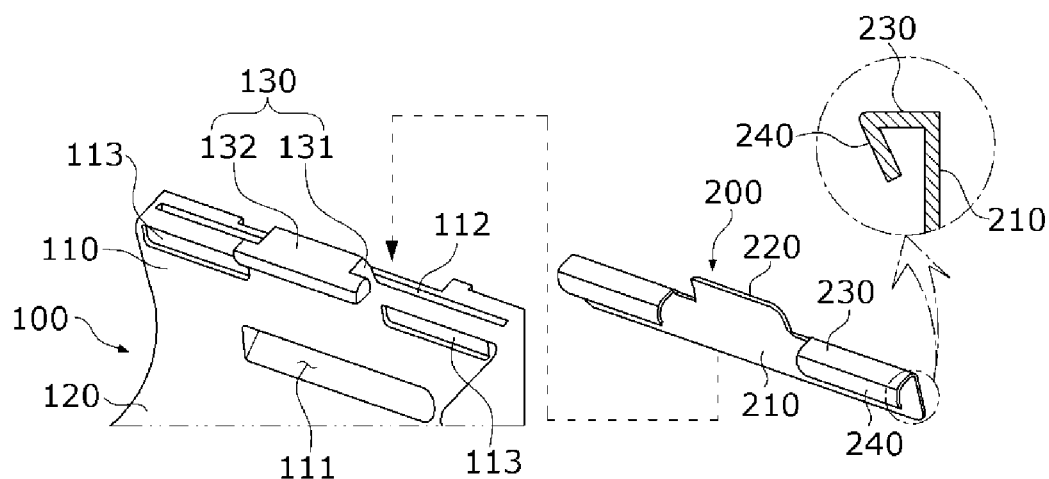
FIG. 4A is a schematic view illustrating a ramp and a reinforcing plate in a fixing apparatus for a curtain airbag cushion according to an embodiment of the present invention.
Figure 4B:
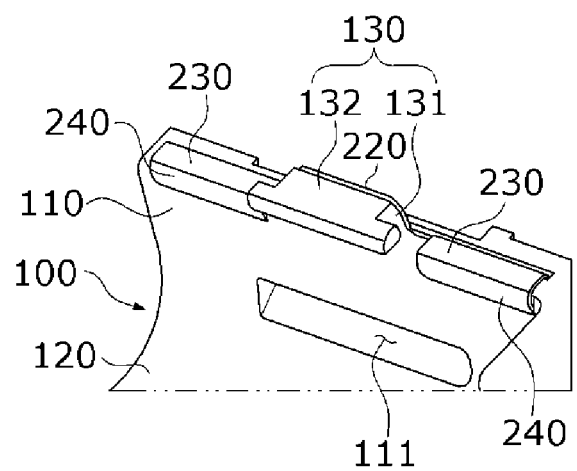
FIG. 4B is a schematic view illustrating a state in which the reinforcing plate is fastened to the ramp in FIG. 4A.
Figure 5A:
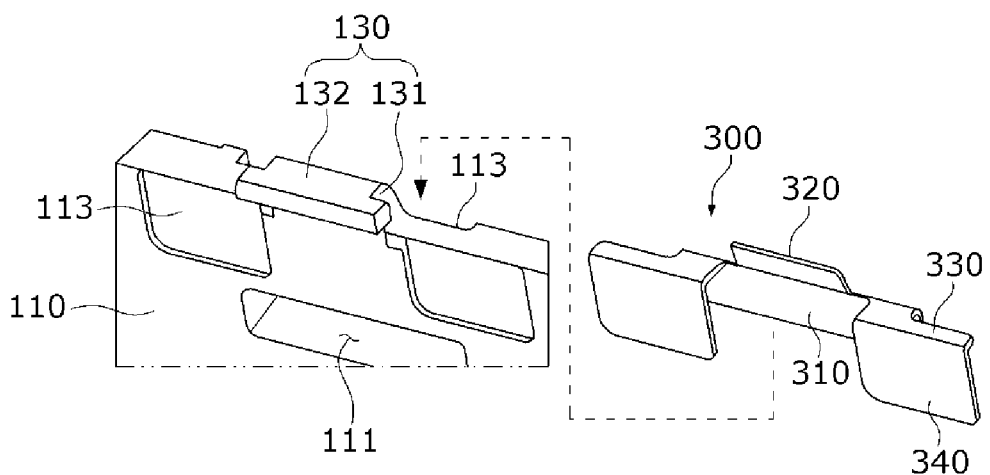
FIG. 5A is a schematic view illustrating a ramp and a reinforcing plate in a fixing apparatus for a curtain airbag cushion according to another embodiment of the present invention.
Figure 5B:
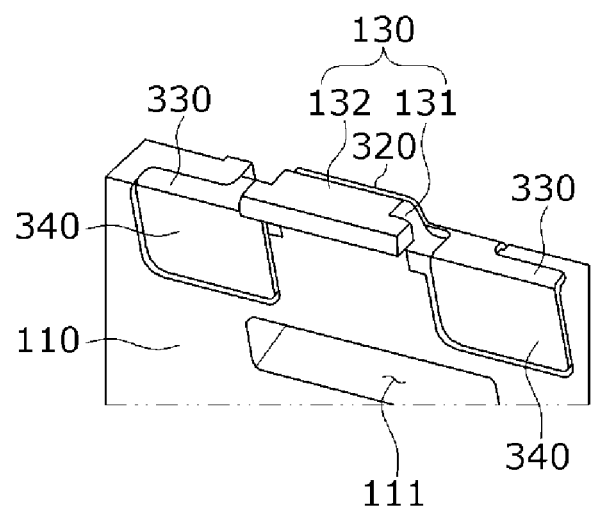
FIG. 5B is a schematic view illustrating a state in which the reinforcing plate is fastened to the ramp in FIG. 5A.
Figure 6A:
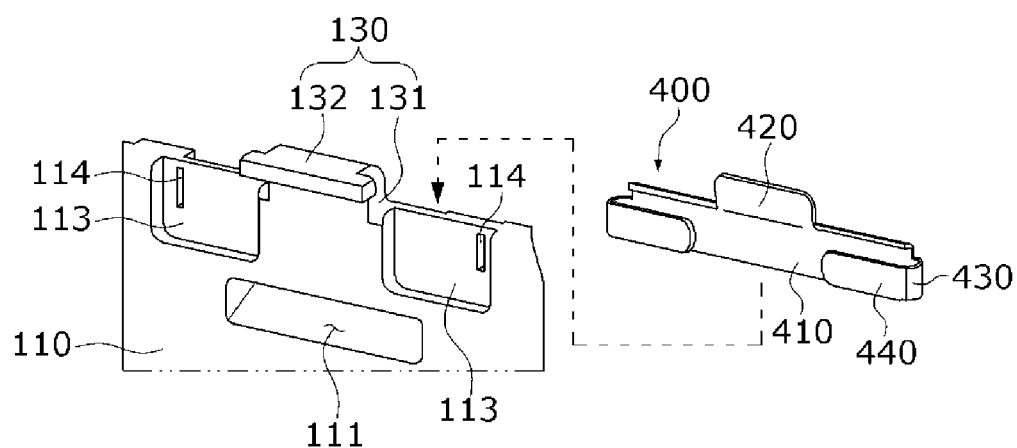
FIG. 6A is a schematic view illustrating a ramp and a reinforcing plate in a fixing apparatus for a curtain airbag cushion according to still another embodiment of the present invention.
Figure 6B:
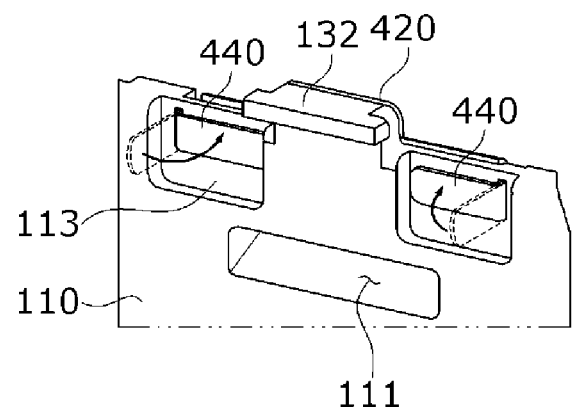
FIG. 6B is a schematic view illustrating a state in which the reinforcing plate is fastened to the ramp.

FIG. 1 is a schematic view illustrating a state in which a curtain airbag is mounted in a vehicle according to an embodiment of the present invention, FIG. 2 is a schematic cross-sectional view along line A-A in FIG. 1, and FIG. 3 is a schematic view illustrating a ramp in a fixing apparatus for a curtain airbag cushion according to an embodiment of the present invention. FIG. 4A is a schematic view illustrating a ramp and a reinforcing plate in a fixing apparatus for a curtain airbag cushion according to an embodiment of the present invention, and FIG. 4B is a schematic view illustrating a state in which the reinforcing plate is fastened to the ramp in FIG. 4A. FIG. 5A is a schematic view illustrating a ramp and a reinforcing plate in a fixing apparatus for a curtain airbag cushion according to another embodiment of the present invention, and FIG. 5B is a schematic view illustrating a state in which the reinforcing plate is fastened to the ramp in FIG. 5A. FIG. 6A is a schematic view illustrating a ramp and a reinforcing plate in a fixing apparatus for a curtain airbag cushion according to still another embodiment of the present invention, and FIG. 6B is a schematic view illustrating a state in which the reinforcing plate is fastened to the ramp.

Referring to the drawings, a curtain airbag 1 according to the embodiment of the present invention may be mounted on a vehicle body panel P to extend in a front-rear direction of the vehicle. In this case, the vehicle body panel P refers to a roof side panel disposed at each of both left and right sides of a roof panel, and a curtain airbag does not need to be directly mounted on the roof side panel.

The curtain airbag 1 may include an inflator 10 which generates gas, a curtain airbag cushion 20 which is connected to the inflator 10 and inflates to protect a passenger when the gas is introduced, and a fixing apparatus 30 which is mounted on the vehicle body panel P and fixedly supports the curtain airbag cushion 20. In one embodiment, a tape 40 for tying the curtain airbag cushion 20 to the fixing apparatus 30 may be added to prevent movement of the curtain airbag cushion 20.

The inflator 10 may be fixed to the vehicle body panel P using a fixing unit such as a clamp.

The curtain airbag cushion 20 may be connected to the inflator 10, and when gas generated by the inflator 10 is introduced into the curtain airbag cushion 20, the curtain airbag cushion 20 may inflate. In one embodiment, the curtain airbag cushion 20 may be provided by being folded and surrounded by a cushion cover 21 to prevent the curtain airbag cushion 20 from being unfolded.

The fixing apparatus 30 may be mounted on the vehicle body panel P and may fixedly support the curtain airbag cushion 20.

Since both the curtain airbag cushion 20 and the cushion cover 21 are formed of flexible materials, when the curtain airbag cushion 20 and the cushion cover 21 are mounted in the vehicle without change, a mounting shape is not standardized due to sagging of the curtain airbag cushion 20 and the cushion cover 21, and thus inflation performance of the curtain airbag cushion 20 can be degraded. Accordingly, the curtain airbag cushion 20 may be mounted on a vehicle body using the fixing apparatus 30.

Hereinafter, the fixing apparatus 30 for a curtain airbag cushion according to the embodiment of the present invention will be described with reference to the accompanying drawings.

Referring to the drawings, the fixing apparatus 30 according to the embodiment of the present invention may include a ramp 100 and a reinforcing plate 200.

The ramp 100 may include a support 110 facing the vehicle body panel P, a prop 120 continuously extending forward to be gently curved from a lower end portion of the support 110, and a hook part 130 disposed or provided at an upper end of the support 110. In the embodiment, the ramp 100 may further include a skirt part 150 extending forward from a center of an upper end of the support 110.

A mount part 140 to be mounted on the vehicle body panel P may be disposed or provided on a lower surface of the prop 120. A fastening hole 141 to which a bolt or the like is fastened may be formed in the mount part 140.

In one embodiment, the support 110, the prop 120, the hook part 130, the mount part 140, and the skirt part 150 may be integrally formed. In this case, the ramp 100 may be formed of a plastic material having sufficient stiffness. However, the material of the ramp 100 is not limited thereto.

The support 110 and the prop 120 may extend to predetermined lengths in a longitudinal direction to support the curtain airbag cushion 20 and may have a cross-sectional structure entirely having an "L" shape.

The support 110 may include an accommodation hole 111 through which a cushion mounting tab 22 connected to the curtain airbag cushion 20 passes in a state in which the curtain airbag cushion 20 is disposed on the prop 120. The accommodation hole 111 may be disposed under the hook part 130 to correspond to a position of the hook part 130.

The cushion mounting tab 22 may pass through the accommodation hole 111, extend upward along a rear surface of the support 110, and be hook-connected to the hook part 130.

The cushion mounting tap 22 may pass through the accommodation hole 111, extend upward along a rear surface of the support 110, and be hook-connected to the hook part 130.

The hook part 130 may include a first body portion 131 extending upward from an upper surface of the support 110 and a second body portion 132 bent forward from the first body portion 131 to form a hooking step.

The hook part 130 may be provided as a single hook part 130 or a plurality of hook parts 130. In the embodiment, an example of two hook parts 130 which are provided apart from each other in the longitudinal direction of the support 110 is illustrated, but two or more hook parts 130 or a single hook part 130 may also be provided.

The hook part 130 may fix the curtain airbag cushion 20 disposed on the prop 120 to prevent movement of the curtain airbag cushion 20, and to this end, the cushion mounting tab 22 connected to the curtain airbag cushion 20 may be fixedly hooked on the hooking step of the hook part 130.

The skirt part 150 may protrude forward from the support 110 between the hook parts 130 and support the curtain airbag cushion 20 with the prop 120. The tape 40 may be disposed or provided on the skirt part 150 to tie the curtain airbag cushion 20 and a circumference of the prop 120.

Meanwhile, when the curtain airbag cushion 20 inflates in a structure in which the cushion mounting tab 22 is fixedly hooked on the hook part 130, a very strong external force is applied to the cushion mounting tab 22, the external force causes damage to the hook part 130 to which the cushion mounting tab 22 is fixed, and sometimes, the external force may cause the support 110 to be deformed or damaged. Accordingly, a phenomenon in which the cushion mounting tab 22 is pulled out from the hook part 130 occurs, and thus the curtain airbag 1 cannot function properly.

In the fixing apparatus 30 according to the embodiment of the present invention, the damage and deformation due to the external force are prevented by mounting the reinforcing plate 200 on the ramp 100 to improve stiffness.

In one embodiment, the reinforcing plate 200 may be detachably mounted on the support 110 at the upper end of the support 110 to cover a rear surface of the hook part 130 facing the vehicle body panel P. Specifically, the reinforcing plate 200 may be disposed to face a rear surface of the first body portion 131 of the hook part 130 to cover the first body portion 131.

Since the first body portion 131 of the hook part 130 and the support 110 connected to the first body portion 131 may sufficiently withstand the external force through reinforcing with the reinforcing plate 200, the damage and deformation can be prevented.

In FIGS. 4A and 4B, a reinforcing plate 200 and a support 110 on which the reinforcing plate 200 is mounted are schematically illustrated according to one embodiment of the present invention.

The reinforcing plate 200 may include a base or base part 210 extending in a longitudinal direction of the support 110, a reinforcing part 220 extending upward from a center of an upper end of the base part 210, connecting parts 230 extending to be bent forward from both left and right sides of the upper end of the base part 210 with the reinforcing part 220 interposed therebetween, and fixing parts 240 extending to be bent downward from ends of the connecting parts 230.

The base part 210 may be formed as a plate structure entirely having a quadrangular shape and may extend to a predetermined length in the longitudinal direction of the support 110. Since the reinforcing part 220 may have a shape corresponding to a first body portion 131 of a hook part 130, the reinforcing part 220 may cover a rear surface of the first body portion 131. The connecting parts 230 may be bent from both left and right sides of the reinforcing part 220 and may extend to a front surface of the support 110. The fixing parts 240 may extend to be bent downward from the ends of the connecting parts 230. In this case, the fixing parts 240 may extend as structures inclined toward the base part 210. That is, the fixing parts 240 may be bent to form acute angles with respect to the connecting parts 230.

The base part 210, the reinforcing part 220, the connecting parts 230, and the fixing parts 240 may be integrally formed. In one embodiment, the reinforcing plate 200 may be formed of a metal material but is not limited thereto.

The support 110 on which the reinforcing plate 200 is mounted may include an upper surface having a fitting groove 112 at which the base part 210 is disposed and a front surface having seating grooves 113 in which the fixing parts 240 are disposed (i.e., seated).

The fitting groove 112 may be positioned around a central portion based on a thickness direction of the support 110, extend to be long, and be formed in a slit shape corresponding to a length and a thickness of the base part 210. The seating groove 113 may be formed to be recessed in the front surface of the support 110 to correspond to a shape of the fixing parts 240. In this case, the seating groove 113 may have an inclined structure in which a recessed depth increases from an upper surface to a lower surface of the support 110.

The reinforcing plate 200 may be mounted on the support 110 to form a structure at which the base part 210 is disposed into the fitting groove 112 of the support 110, and the fixing parts 240 are seated in the seating grooves 113.

In FIGS. 5A and 5B, a reinforcing plate 300 and a support 110 on which the reinforcing plate 300 is mounted are schematically illustrated according to another embodiment of the present invention.

The reinforcing plate 300 may include a base part 310 extending in a longitudinal direction of the support 110, a reinforcing part 320 extending upward from a center of an upper end of the base part 310, connecting parts 330 extending to be bent forward from both left and right sides of the upper end of the base part 310 with the reinforcing part 320 interposed therebetween, and fixing parts 340 extending to be bent downward from ends of the connecting parts 330.

A structure of the reinforcing plate 300 illustrated in FIGS. 5A and 5B is substantially the same as a structure of the reinforcing plate 200 illustrated in FIGS. 4A and 4B. However, in the case of the reinforcing plate 300 illustrated in FIGS. 5A and 5B, there are differences that a length of the connecting part 330 is greater than a thickness of the support 110 and a size of the fixing part 340 further increases.

The support 110 on which the reinforcing plate 300 is mounted may include seating grooves 113 which are formed in a front surface and a rear surface and in which the fixing part 340 and the base part 310 are seated, respectively.

The reinforcing plate 300 may be mounted on the support 110 to form a structure in which the base part 310 is seated in the seating groove 113 of the rear surface of the support 110 and the fixing part 340 is seated in the seating groove 113 of the front surface of the support 110.

In FIGS. 6A and 6B, a reinforcing plate 400 and a support 110 on which the reinforcing plate 400 is mounted are schematically illustrated according to still another embodiment of the present invention.

The reinforcing plate 400 may include a base part 410 extending in a longitudinal direction of the support 110, a reinforcing part 420 extending upward from a center of an upper end of the base part 410, connecting parts 430 extending to be bent from both left and right sides of the base part 410, and fixing parts 440 extending to be bent from ends of the connecting parts 430 toward the base part 410.

The support 110 on which the reinforcing plate 400 is mounted may include a front surface having seating grooves 113 in which fixing parts 440 are seated, and the seating grooves 113 may include through holes 114 passing through the support 110.

The reinforcing plate 400 having a structure in which the fixing parts 440 passing through the through holes 114 from a rear surface to the front surface of the support 110 are bent to be seated in the seating grooves 113 may be mounted on the support 110.

According to embodiments of the present invention, when an airbag cushion inflates, a ramp is prevented from being damaged and deformed, and thus a cushion mounting tab can be prevented from being pulled out so that inflation of a curtain airbag cushion is improved.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A fixing apparatus configured to be coupled to a vehicle body panel and support a curtain airbag cushion, the fixing apparatus comprising:
a ramp including (1) a support having a rear surface facing the vehicle body panel, (2) a curved prop extending from a lower end portion of the support, and (3) a hook disposed at an upper end portion of the support; and
a reinforcing plate detachably coupled to the upper end portion of the support and covering the rear surface of the hook.

2. The fixing apparatus of claim 1, wherein:
the hook includes:
a first body portion extending upwardly from an upper surface of the support; and
a second body portion extending from the first body portion and bent to form a stepped hook, and
the reinforcing plate faces a rear surface of the first body portion and covers the first body portion.

3. The fixing apparatus of claim 1, wherein the reinforcing plate includes:
a base extending in a longitudinal direction of the support;
a reinforcing part extending upwardly from a center of an upper end portion of the base;
first and second bent connecting parts respectively extending from left and right sides of the upper end portion of the base with the reinforcing part interposed therebetween; and
first and second bent fixing parts extending downwardly from ends of the first and second connecting parts, respectively.

4. The fixing apparatus of claim 3, wherein the support includes:
an upper surface having a fitting groove at which the base is disposed; and
a front surface having first and second seating grooves at which the first and second fixing parts are respectively disposed.

5. The fixing apparatus of claim 3, wherein the support includes front and rear surfaces respectively having first and second seating grooves at which the first and second fixing parts and the base are respectively disposed.

6. The fixing apparatus of claim 1, wherein the reinforcing plate includes:
a base extending in a longitudinal direction of the support;
a reinforcing part extending upwardly from a center of an upper end portion of the base;
first and second bent connecting parts extending from left and right ends of the base, respectively; and first and second bent fixing parts respectively extending from ends of the first and second connecting parts toward the base.

7. The fixing apparatus of claim 6, wherein:
the support includes a front surface having first and second seating grooves at which the first and second fixing parts are respectively disposed;
the first and second seating grooves include through holes; and
the first and second fixing parts pass through the through holes from a rear surface to the front surface of the support and are disposed at the first and second seating grooves, respectively.

8. The fixing apparatus of claim 1, wherein the reinforcing plate comprises metal.

9. The fixing apparatus of claim 1, further comprising a cushion mounting tab disposed on the prop and connected to the curtain airbag cushion,
wherein the support includes an accommodation hole through which the cushion mounting tab passes, and the accommodation hole is disposed below the hook.

10. The fixing apparatus of claim 1, wherein a plurality of hooks are disposed at the upper end portion of the support.

11. A curtain airbag comprising:
the fixing apparatus and the curtain airbag cushion of claim 1; and
an inflator coupled to the curtain airbag cushion and configured to supply a gas to the curtain airbag cushion.

* * * * *